No. 779,175. Patented January 3, 1905.

UNITED STATES PATENT OFFICE.

RUDOLF MÜLLER, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

MANUFACTURE OF SILK-LIKE THREAD.

SPECIFICATION forming part of Letters Patent No. 779,175, dated January 3, 1905.

Application filed October 31, 1904. Serial No. 230,884.

*To all whom it may concern:*

Be it known that I, RUDOLF MÜLLER, Ph. D., chemist, a citizen of the Empire of Germany, residing at Höchst-on-the-Main, Germany, have invented certain new and useful Improvements in the Manufacture of Silk-Like Threads, of which the following is a specification.

I have found a new process for the manufacture of silk-like threads, which consists in allowing ammoniacal solutions of cellulose-cupprammonium to issue through capillary tubes into solutions of caustic alkalies. The threads thus formed are wound up, then washed with acids and water, and finally dried. They are distinguished by their solidity and brilliancy.

For the solutions of cellulose those of its hydration products mentioned in literature as "cellulose hydrate" and "hydro-cellulose" may be used, and hereinafter "cellulose" is meant to include all these compounds.

Alkalies do not precipitate the cellulose as such from its cupprammonium solutions, but in a combination with copper. By this the present process is differentiated from other known similar processes. The threads obtained containing copper are washed with acids. Thus the cupreous compound is decomposed and there remains a remarkably strong thread. The process is not essentially changed by first drying the threads containing copper, washing with acids and water, and finally redrying them.

The concentration of the caustic alkaline lye used to separate the cellulose from its solution may vary considerably. For instance, the separation may also be effected by a caustic-soda lye of four per cent. strength, yet the thread obtained with a dilution to this extent seems to be less strong, while a strong concentration does not affect its solidity.

Example: A solution of cellulose in ammoniacal cupric oxid obtained at ordinary temperature and containing about five per cent. of cellulose is allowed to issue through capillary apertures into caustic-soda lye of about forty per cent. strength. The thread thus formed is directly wound up and washed successively with sulfuric acid of about twelve per cent. strength and water and finally dried in a stretched condition.

In carrying out this process it is practical to surround the tube with the capillary aperture with a second tube, through which the caustic-soda lye is allowed to slowly pass the capillary aperture, both apertures being downwardly directed. The thread formed descends and is collected on a rotating drum. It is also preferable to carry out the washing successively with an acid and water and finally drying on a drum, as it is already described in English specification No. 17,901 of 1897, relating to threads obtained from a zinc-chlorid cellulose solution. Like threads, films may be obtained by an analogous process if a thin layer of the cellulose-cupprammonium solution is treated with caustic-soda lye, washed with acid and water, and finally dried.

Having now described my invention, what I claim is—

1. The herein-described process for the manufacture of silk-like threads, which consists in allowing ammoniacal solutions of "cellulose-cupprammonium" to issue through capillary tubes into caustic alkaline solutions, washing the wound-up thread thus formed successively with acids and water and subsequently drying it.

2. Silk-like threads obtained by allowing ammoniacal solutions of cellulose-cupprammonium to issue through capillary tubes into caustic alkaline solutions, washing the wound-up thread thus formed successively with acids and water and subsequently drying it.

In testimony that I claim the foregoing as my invention I have signed my name in presence of two subscribing witnesses.

RUDOLF MÜLLER.

Witnesses:
 ALFRED BRISBOIS,
 JOSEPH FLACH.